United States Patent Office 3,534,037
Patented Oct. 13, 1970

3,534,037
SPIRO-[IMIDAZOLIDINE AND PYRIMIDINE-QUINOLINE AND CYCLOPROPA[c]QUINO-LINE] COMPOUNDS
Bernard Loev, Broomall, Pa., assignor to Smith Kline & French Laboratories, Philadelphia, Pa., a corporation of Pennsylvania
No Drawing. Continuation-in-part of application Ser. No. 548,849, May 10, 1966. This application May 10, 1968, Ser. No. 728,352
Int. Cl. C07d 33/10, 3/12
U.S. Cl. 260—256.4                                          9 Claims

ABSTRACT OF THE DISCLOSURE

Spiro[imidazolidine and pyrimidine-quinoline] and spiro[1H - cyclopropa[c]quinoline - imidazolidine and -pyrimidine] compounds having pharmacodynamic activity such as hypotensive, central nervous system depressant and muscle relaxant activity are prepared by reacting a 2-lower alkoxy or 2-chloroquinolinium salt or a di-lower alkylacetal of a carbostyril with a diamine or diamide.

---

This application is a continuation-in-part of Ser. No. 548,849 filed May 10, 1966, now abandoned.

This invention relates to new spiro[imidazolidine- and pyrimidine - quinoline] and spiro[1H - cyclopropa[c]-quinoline-imidazolidine and -pyrimidine] compounds having pharmacodynamic activity and to intermediates and a process useful in preparing compounds of this invention.

The new heterocyclic spirans of this invention having pharmacodynamic activity are represented by the following formula:

FORMULA I

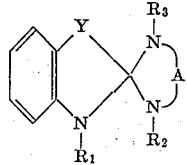

when:

A is an alkylene chain of 2-3 carbon atoms having 0-3 lower alkyl substituents and 0-1 phenyl substituents or a dioxyalkylene chain of the formula

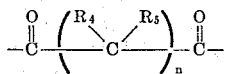

$n$ is 0 or 1;
Y is —CH=CH—, —CH$_2$—CH$_2$—or

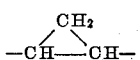

$R_1$ is hydrogen, lower alkyl or lower alkoxy;
$R_2$ and $R_3$ are hydrogen or lower alkyl;
$R_4$ is hydrogen, lower alkyl or phenyl; and
$R_5$ is hydrogen or lower alkyl.

The pharmacodynamically active compounds of this invention have the basic structure of Formula I. However, it is apparent to one skilled in the art that obvious nuclear substituents may be incorporated on the benzenoid ring of the quinoline nucleus. Such substituents, which are known to the art, are halogen, trifluoromethyl, lower alkyl, lower alkoxy, hydroxy, nitro, amino, mono-lower alkylamino, di-lower alkylamino, lower alkanoyl-amino, lower alkoxycarbonyl, carboxy, carbamoyl, sulfamoyl or methylenedioxy. These substituted compounds are used as are the parent compounds.

Advantageous compounds of this invention are represented by Formula I in which A is ethylene, propylene or 2-lower alkyl-2-phenyl-1,3-dioxypropylene; $R_1$ is lower alkyl; and $R_2$ and $R_3$ are hydrogen or methyl.

The compounds of Formula I in which A is an alkylene chain as defined hereabove have, in particular, hypotensive activity as demonstrated by administration to anesthetized dogs at doses of 5 to 10 mg./kg. intravenously. The compounds of Formula I in which A is a dioxyalkylene chain as defined hereabove have, in particular, central nervous system depressant activity, as shown by a decrease in motor activity, and muscle relaxant activity, which activities are demonstrated by administration to rats at doses of 100 to 300 mg./kg. orally.

This invention also includes pharmaceutically acceptable salts of the compounds of Formula I in which A is an alkylene chain of 2-3 carbon atoms having 0-3 lower alkyl substituents and 0-1 phenyl substituents formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bis-methylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromo-theophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

In addition, this invention relates to benzyl compounds which are represented by the following formula:

FORMULA II

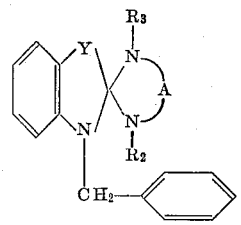

when A, Y, $R_2$ and $R_3$ are as defined in Formula I.

The benzyl compounds of Formula II are useful as intermediates in the preparation of compounds of Formula I in which $R_1$ is hydrogen as is described herebelow.

Benzyl compounds having the basic structure of Formula II may have substituents, such as halogen, trifluoromethyl, lower alkyl, lower alkoxy, hydroxy, nitro, amino, mono-lower alkylamino, di-lower alkylamino, lower alkanoylamino, lower alkoxycarbonyl, benzyloxycarbonyl, carbamoyl, sulfamoyl or methylenedioxy, incorporated on the benzenoid ring of the quinoline nucleus. These compounds are used as described herebelow, to prepare pharmacodynamically active compounds which have the basic structure of Formula I in which $R_1$ is hydrogen and which are substituted on the benzenoid ring of the quinoline nucleus.

The terms "lower alkyl," "lower alkoxy" and "lower alkanoyl" where used herein denote groups having 1–4, preferably 1–2, carbon atoms and "halogen" denotes chloro, bromo or fluoro.

Heterocyclic spirans of this invention are prepared by the following process which is also an object of this invention:

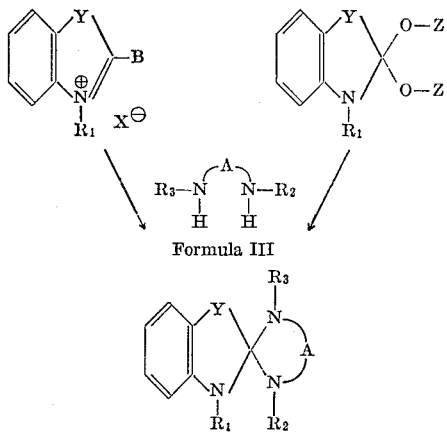

Formula III

The terms A, Y, $R_2$ and $R_3$ are as defined above;

$R_1$ is lower alkyl, lower alkoxy or benzyl;

Z is lower alkyl;

B is lower alkoxy or chloro; and

X is an anion such as methosulfate or fluoroborate.

According to the above procedure, the quinolinium salt or the di-lower alkylacetal of the carbostyril is reacted with about an equimolar amount of a diamine or diamide of the formula

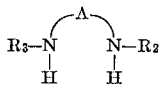

in which A, $R_2$ and $R_3$ are as defined above. The reaction is carried out in an inert solvent such as methylene chloride, chloroform or a lower alkanol at about room temperature for about 1–4 hours to give the heterocyclic spirans of Formula III.

The 2-lower alkoxyquinolinium salts are prepared by reacting a carbostyril with an alkylating agent such as a lower alkylsulfate or a tri-lower alkyloxonium fluoborate. The lower alkylsulfate salts are prepared by reacting equimolar amounts of the carbostyril and the lower alkylsulfate at elevated temperatures for example at about 70–100° C. for about 1–3 hours. The fluoborate salts are prepared by reacting equimolar amounts of the carbostyril and the tri-lower alkyloxonium fluoborate at about room temperature in an inert solvent such as methylene chloride.

Alternatively, the 2-lower alkoxyquinolinium salts are prepared by reacting a 2-lower alkoxyquinoline with a lower alkylsulfate or halide, preferably in an inert solvent such as chloroform, benzene or a lower alkanol.

The 2-chloroquinolinium salts are prepared by reacting an N-unsubstituted carbostyril with a chlorinating agent such as phosphorus pentachloride, phosphorus oxychloride, tosyl chloride in pyridine or carbonyl chloride, then forming the N-lower alkylquinolinium salt with an alkylating agent such as a lower alkylsulfate or a tri-lower alkyloxonium fluoborate as described above for the preparation of the 2-lower alkoxyquinolinium salts.

The di-lower alkylacetals of carbostyrils are prepared by treating the quinolinium salts with a sodium lower alkoxide. The reaction is carried out in a solvent such as a lower alkanol at about room temperature for about 15–60 minutes. The solvent is removed in vacuo and the residue is distilled. Alternatively, the residue, without distillation, may be used in the reaction with the diamine or diamide in the reaction described above.

The compounds of Formula I in which $R_1$ is hydrogen are prepared by hydrogenation of the benzyl intermediates of Formula II. The hydrogenation is carried out at room temperature in the presence of a catalyst such as, for example, platinum in ethyl acetate.

Substituents, such as halogen, trifluoromethyl, lower alkyl, lower alkoxy, hydroxy, nitro, di-lower alkylamino, lower alkanoylamino, lower alkoxycarbonyl, benzyloxycarbonyl, carbamoyl, sulfamoyl or methylenedioxy, may be present on the benzenoid ring of the carbostyril starting material to prepare substituted spiran compounds.

Compounds having the basic structures of Formulas I and II and having an amino or mono-lower alkylamino substituent on the benzenoid ring of the quinoline are prepared as follows. The amino substituted compounds are prepared by reducing the corresponding nitro compounds by catalytic hydrogenation at room temperature or chemically, for example, with stannous chloride in hydrochloric acid. The mono-lower alkylamino substituted compounds are prepared by reducing the lower alkanoyl group in a lower alkanoylamino substituted compound, for example, with lithium aluminum hydride in ether or tetrahydrofuran.

Compounds having the basic structure of Formula I and having a carboxy substituent on the benzenoid ring of the quinoline are prepared by catalytic hydrogenation of the corresponding benzyloxycarbonyl substituted compounds at room temperature using, for example, palladium-on-carbon in ethyl acetate.

Compounds having the basic structure of Formula I in which $R_1$ is hydrogen and having a nitro substituent on the benzenoid ring of the quinoline are prepared by oxidizing the corresponding amino compounds using peroxytrifluoroacetic acid.

The carbostyril starting materials are either known to the art or are prepared by known methods, for example, as described in U.S. 3,141,888.

The compounds of Formula I may be administered internally in conventional dosage forms by incorporating an appropriate dose of the compound with pharmaceutical carriers according to accepted pharmaceutical practices.

The following examples are not limiting but are illustrative of the compounds and the process of this invention.

EXAMPLE 1

A mixture of 15.9 g. of 1-methylcarbostyril and 12.6 g. of methyl sulfate is heated in an oil bath at 80° C. for two hours, then cooled and washed with ether to give 2-methoxy-1-methylquinolinium methosulfate.

2-methoxy-1-methylquinolinium methosulfate (6.9 g.) is added to 1.4 g. of sodium methoxide in ethanol. The mixture is stirred for 30 minutes, then concentrated and distilled to give the dimethyl acetal of 1-methylcarbostyril.

To a methylene chloride solution of 6.15 g. of the above prepared acetal is added 2.64 g. of N,N'-dimethylethylenediamine in methylene chloride. The resulting mixture is stirred for four hours, then concentrated in vacuo. The residue is dissolved in hexane, then washed with water and concentrated in vacuo. The residue is dissolved in ether, treated with hydrochloric acid and filtered to give 1,1',3 - trimethylspiro[imidazolidine-2,2' (1'H)-quinoline]dihydrochloride.

Dissolving the dihydrochloride in aqueous ethanol, neutralizing with aqueous sodium hydroxide, extracting with ether and removing the ether from the extracts in vacuo gives 1,1'3 - trimethylspiro[imidazolidine - 2,2' (1'H)-quinoline]

EXAMPLE 2

To 0.81 g. of sodium methoxide in ethanol is added 4.3 g. of 2 - methoxy - 1 - methylquinolinium methosulfate. The resulting mixture is stirred for 10 minutes, then concentrated in vacuo. To the residue is added 100 ml. of methylene chloride, then 3.09 g. of 2-ethyl-2-phenylmalonamide. The mixture is stirred at room temperature for 2.5 hours, then filtered and concentrated in vacuo. Recrystallizing the residue from ethanol gives 5 - ethyl - 1' - methyl - 5 - phenylspiro - [pyrimidine-2(1H),2'(1'H)-quinoline]-4,6(3H,5H)-dione.

EXAMPLE 3

Stirring 2 - methoxy - 1 - methylquinolinium methosulfate with sodium methoxide in ethanol for 10 minutes, then concentrating in vacuo, adding methylene chloride and reacting with the following diamines by the procedure of Example 1:

1,3-propanediamine
N,N'-dimethyl-1,3-propanediamine
2-methyl-2-phenyl-1,3-propanediamine
2-phenyl-2-propyl-1,3-propanediamine
2-butyl-2-ethyl-1,3-propanediamine
N,N'-dibutylethylenediamine
N,N'-diethyl-2,3-butanediamine
2-methyl-2,3-butanediamine the following products are obtained, respectively:

3,4,5,6-tetrahydro-1'-methylspiro[pyrimidine-2(1H),2'(1'H)-quinoline]
3,4,5,6-tetrahydro-1,1',3-trimethylspiro[pyrimidine-2(1H),2'(1'H)-quinoline]
3,4,5,6-tetrahydro-1',5-dimethyl-5-phenylspiro-[pyrimidine-2(1H),2'(1'H)-quinoline]
3,4,5,6-tetrahydro-1'-methyl-5-phenyl-5-propyl-spiro[pyrimidine-2(1H),2'(1'H)-quinoline]
5-butyl-5-ethyl-3,4,5,6-tetrahydro-1'-methyl-spiro[pyrimidine-2(1H),2'(1'H)-quinoline]
1,3-dibutyl-1'-methylspiro[imidazolidine-2,2'(1'H)-quinoline]
1,3-diethyl-1',4,5-trimethylspiro[imidazolidine-2,2'(1'H)-quinoline]
1',4,4,5-tetramethylspiro[imidazolidine-2,2'(1'H)-quinoline].

Treating 1',4,4,5 - tetramethylspiro[imidazolidine - 2,2'-(1'H)-quinoline] in ether with hydrogen bromide gives the dihydrobromide salt.

EXAMPLE 4

By the procedure of Example 2, using the following malonamides in place of 2-ethyl-2-phenylmalonamide:

N,N'-dimethylmalonamide
2,2-dibutylmalonamide
2-butylmalonamide
2-(p-chlorophenyl)-2-methylmalonamide
2-(m-chlorophenyl)-2-ethylmalonamide
2-ethyl-2-(p-fluorophenyl)malonamide the following products are obtained, respectively:

1,1',3-trimethylspiro[pyrimidine-2(1H),2'(1'H)-quinoline]-4,6(3H,5H)-dione
5,5-dibutyl-1'-methylspiro[pyrimidine-2(1H),2'(1'H)-quinoline]-4,6(3H,5H)-dione
5-butyl-1'-methylspiro[pyrimidine-2(1H),2'(1'H)-quinoline]4,6(3H,5H)-dione
5-(p-chlorophenyl)-1',5-dimethylspiro[pyrimidine-2(1H),2'(1'H)-quinoline]4,6(3H,5H)-dione
5-(m-chlorophenyl)-5-ethyl-1'-methylspiro[pyrimidine-2(1H),2'(1'H)-quinoline]4,6(3H,5H)-dione
5-ethyl-5-(p-fluorophenyl)-1'-methylspiro[pyrimidine-2-(1H),2'(1'H)-quinoline]4,6(3H,5H)-dione.

EXAMPLE 5 p-Trifluoromethylphenylacetic acid (14 g.) is suspended in 50 ml. of thionyl chloride and the mixture is heated at reflux for one hour. Volatile materials are removed in vacuo and the residual acid chloride is slowly added to 50 ml. of liquid ammonia. The excess ammonia is allowed to evaporate and the solid residue is washed with water to give p-trifluoromethylphenylacetamide.

p-Trifluoromethylphenylacetamide (11 g.) is dissolved in 30 ml. of thionyl chloride and the resulting solution is refluxed for one hour. Excess thionyl chloride is removed by distillation and the residual oil is distilled to give p-trifluoromethylphenylacetonitrile.

To a mixture of 1.0 g. of sodium in 35 ml. of ethanol at 0° C. is added 6.0 g. of p-trifluoromethylphenylacetonitrile. Ethyl iodide (6.0 g.) is added and the mixture is heated at reflux for five hours, then cooled and poured into water. Extracting with ether and concentrating and distilling in vacuo gives αethyl-p-trifluoromethylphenylacetonitrile.

A mixture of 3.2 g. of α-ethyl-p-trifluoromethylphenylacetonitrile and 10 ml. of tetrahydrofuran is added to a suspension of 1.8 g. of 40% potassium hydride (in oil) in 15 ml. of tetrahydrofuran. Carbon dioxide is passed into the mixture. The solvent is removed in vacuo; the residue is dissolved in water and washed with ether. The aqueous solution is acidified with hydrochloric acid. The organic layer is separated and solvent distilled off to give α-cyano-α-ethyl-p-trifluoromethylphenylacetic acid.

Ten grams of the above prepared acid is refluxed with 30 ml. of thionyl chloride for one hour, then the mixture is concentrated in vacuo and treated with 35 ml. of liquid ammonia. Evaporating the excess ammonia gives α-cyano-α-ethyl-p-trifluoromethylphenylacetamide.

Eight grams of the above prepared cyano compound is heated with 50 ml. of concentrated sulfuric acid at 90°–100° C. for 10 minutes. The mixture is then poured onto ice. Fltering gives 2-ethyl-2-(p-trifluoromethyl)phenylmalonamide.

1-methyl-2-methoxyquinolinium methosulfate (4.3 g.) is added to 0.81 g. of soduim methoxide in ethanol and the resulting mixture is stirred for 10 minutes, then concentrated in vacuo. Methylen chloride (100 ml.) is added followed by 4.2 g. of 2-ethyl-2-p-trifluoromethylphenyl-malonamide. The resulting mixture is stirred at room temperature for three hours, then filtered and concentrated in vacuo to give 5-ethyl-1'-methyl-5-(p-trifluoromethyl)phenylspiro[pyrimidine - 2 - (1H),2'(1'H)-quinoline]-4,6(3H,5H)-dione.

EXAMPLE 6

Reducing α - cyano - α - ethyl-p-trifluoromethylphenylacetamide (prepared as in Example 5) by heating with lithium aluminum hydride in tetrahydrofuran at about 90–95° C. for two hours, then working up by adding a small amount of water with decanting the organic layer and concentrating it to dryness in vacuo gives 2-ethyl-2-(p-trifluoromethyl)phenyl-1,3-propanediamine.

Heating this diamine at reflux with an excess of methyl formate and reducing with lithium aluminum hydride by the procedure described above gives 2-ethyl-N,N'-dimethyl - 2-(p-trifluoromethyl)phenyl-1,3-propanediamine.

Using 7.9 g. of the above prepared diamine in the procedure of Example 3, the product is 5-ethyl-3,4,5,6-tetrahydro-1,1',3-trimethyl - 5 - (p-trifluoromethylphenyl) spiro-[pyrimidine-2(1H)-2'(1'H)-quinoline].

EXAMPLE 7

Triethyloxonium fluoborate (55 g.) is added to 46 g. of 1-methylcarbostyril in 60 ml. of methylene chloride at room temperature. The solid material is isolated by filtration to give 2-ethoxy-1-methylquinolinium fluoborate.

To a solution of 23 g. of sodium ethoxide in 250 ml. of ethanol is added 62 g. of 2-ethoxy-1-methylquinolinium fluoborate portionwise over one hour. After one hour, the mixture is filtered, concentrated and filtered in vacuo. Hexane is added to the solid material and the solution is filtered, concentrated and distilled to give the diethyl acetal of 1-methylcarbostyril.

1,2-propanediamine (7.4 g.) in 100 ml. of methylene chloride is added to 23.3 g. of the diethyl acetal of 1- methylcarbostyril in methylene chloride. The resulting mixture is stirred for four hours, then worked up as in Example 1 to give 1',4-dimethylspiro[imidazolidine-2,2'(1'H)-quinoline].

EXAMPLE 8

By the procedure of Example 7, the following carbostyrils are converted to the quinolinium fluoborate salts:

1-methyl-6-trifluoromethylcarbostyril
3,4-dihydro-1-methyl-6-trifluoromethylcarbostyril Each of the above prepared salts is added to sodium ethoxide in ethanol and the resulting mixture is concentrated in vacuo and treated with methylene chloride, then with 2-ethyl-2-phenylmalonamide as in Example 2 to give, respectively:

5 - ethyl - 1' - methyl - 5 - phenyl-6'-trifluoromethylspiro[pyrimidine-2(1H),2'(1'H) - quinoline] - 4,6(3H,5H)-dione
5 - ethyl - 3',4' - dihydro - 1' - methyl - 5 - phenyl - 6'-trifluoromethylspiro[pyrimidine - 2(1H),2'(1'H)-quinoline]-4,6(3H,5H)-dione.

EXAMPLE 9

By the procedure of Example 7, the following compounds are converted to the quinolinium fluoborate salts:

1a,7b-dihydro-3-methyl-6-trifluoromethyl-1H-cyclopropa[c]quinolin-2-one
1a,7b-dihydro-3-methyl-5,6-methylenedioxy-1H-cyclopropa[c]quinolin-2-one
6-bromo-1a,7b-dihydro-3-methyl-1H-cyclopropa[c]-quinolin-2-one
1a,7b-dihydro-3-methoxy-1H-cyclopropa[c]-quinolin-2-one
3-benzyl-6-chloro-1a,7b-dihydro-1H-cyclopropa-[c]quinolin-2-one.

Each of these salts is reacted with sodium ethoxide in ethanol, the mixture is concentrated and reacted with 2-ethyl-2-phenylmalonamide as in Example 2 to give the following products, respectively:

5' - ethyl - 1a,7b - dihydro-3-methyl-5'-phenyl-6-trifluoromethylspiro[1H - cyclopropa[c]quinoline - 2(3H),2'(1'H)-pyrimidine]-4',6'(3'H,5'H)-dione
5' - ethyl - 1a,7b - dihydro - 3- methyl - 5,6-methylenedioxy - 5' - henylsprio[1H - cyclopropa[c]quinoline - 2(3H),2'(1'H)-pyrimidine]-4',6'(3'H,5'H)-dione
6 - bromo - 6' - ethyl - 1a,7b - dihydro - 3 - methyl - 5'-phenylspiro[1H - cyclopropa[c]quinoline - 2(3H),2'(1'H)-pyrimidine]-4',6'(3'H,5'H)-dione
5' - ethyl - 1a,7b - dihydro - 3 - methoxy - 5' - phenylspiro-[1H-cyclopropa[c]quinoline - 2(3H),2'(1'H) - pyrimidine)-4',6'(3'H,5'H)-dione
3 - benzyl - 6 - chloro - 5' - ethyl - 1a,7b - dihydro - 5'-phenylspiro[1H - cyclopropa[c]quinoline 2(3H),2'(1'H)-pyrimidine]-4',6'(3'H,5'H)-dione.

Hydrogenating the above prepared 3-benzyl compound at room temperature in ethanol using palladium-on-carbon as catalyst, then filtering, concentrating and recrystallizing the residue from isopropyl ether gives 6-chloro-5'-ethyl-1a,7b - dihydro - 5' - phenylspiro[1H - cyclopropa[c] quinoline - 2(3H),2'(1'H) - pyrimidine] - 4',6'(3'H,5'H)-dione.

EXAMPLE 10

A mixture of 8.0 g. of 3,4-dihydro-1-methylcarbostyril (prepared by hydrogenating 1-methylcarbostyril in ethanol in the presence of Raney nickel) and 6.3 g. of methyl sulfate is heated at 80° C. for two hours, then washed with ether to give 3,4-dihydro-2-methoxy-1-methylquinolinium methosulfate.

Stirring the above prepared salt with sodium methoxide in ethanol, concentrating in vacuo, adding methylene chloride and reacting with N,N'-dimethylenediamine by the procedure of Example 1 gives 3',4'-dihydro-1,1,3-trimethylspiro[imidazolidine-2,2'(1'H)-quinoline].

Similarly, using 1-ethyl-3,4-dihydrocarbostyril the product is 1'-ethyl-3',4'-dihydro-1,3-dimethylspiro[imidazolidine-2,2'(1'H)-quinoline]. Treating with two equivalents of glacial acetic acid in ether, then removing the solvent in vacuo gives 1'-ethyl-3',4'-dihydro-1,3-dimethylspiro[imidagolidine-2,2'(1'H)-quinoline] diacetate.

EXAMPLE 11

By the procedure of Example 10, the following carbostyrils are converted to the quinolinium methosulfate salts:

1,7-dimethylcarbostyril
6-methoxy-1-methylcarbostyril
1-methyl-6-nitrocarbostyril
6-dimethylamino-1-methylcarbostyril
6-acetamido-1-methylcarbostyril
6-methoxycarbonyl-1-methylcarbostyril
6-carbamoyl-1-methylcarbostyril
1-methyl-6-sulfamoylcarbostyril
5,7-dichloro-1-methylcarbostyril
6,7-dimethoxy-1-methylcarbostyril
1-propylcarbostyril.

Each of the above salts is reacted with sodium methoxide in ethanol and the mixture is concentrated in vacuo, then treated with methylene chloride, then with 2-ethyl-2-phenylmalonamide as in Example 2 to give the following products, respectively:

5-ethyl-1',7'-dimethyl-5-phenylspiro[pyrimidine 2(1H)2'(1'H)-quinoline]-4,6(3H,5H)-dione
5-ethyl-6'-methoxy-1'-methyl-5-phenylspiro[pyrimidine-2(1H),2'(1'H)-quinoline]-4,6-(3H,5H)-dione
5-ethyl-1'-methyl-6'-nitro-5-phenylspiro[pyrimidine-2(1H),2'(1'H)-quinoline]-4,6(3H,5H)-dione
6'-dimethylaminoethyl-5-ethyl-1'-methyl-5-phenylspiro[pyrimidine-2(1H),2'(1'H)-quinoline]-4,6(3H,5H)-dione
6'-acetamido-5-ethyl-1'-methyl-5-phenylspiro[pyrimidine-2(1H),2'(1'H)-quinoline]-4,6(3H,5H)-dione
5-ethyl-6'-methoxycarbonyl-1'-methyl-5-phenylspiro[pyrimidine-2(1H),2'(1'H)-quinoline]-4,6(3H,5H)-dione
6'-carbamoyl-5-ethyl-1'-methyl-5-phenylspiro[pyrimidine-2(1H),2'(1'H)-quinoline]-4,6(3H,5H)-dione
5-ethyl-1'-methyl-5-phenyl-6'-sulfamoylspiro[pyrimidine-2(1H),2'(1'H)-quinoline]-4,6(3H,5H)-dione
5',7'-dichloro-5-ethyl-1'-methyl-5-phenylspiro[pyrimidine-2(1H),2'(1'H)-quinoline]-4,6(3H,5H)-dione
5-ethyl-6',7'-dimethoxy-1'-methyl-5-phenylspiro[pyrimidine-2(1H),2'(1'H)-quinoline]-4,6(3H,5H)-dione
5-ethyl-5-phenyl-1'-propylspiro[pyrimidine-2-(1H),2'(1'H)-quinoline]-4,6(3H,5H)-dione.

Using 6-hydroxy-1-methylcarbostyril and 6,7-dihydroxy-1-methylcarbostyril (prepared by refluxing the corresponding 6-methoxy and 6,7-dimethoxy compounds with hydrobromic acid in acetic acid for four hours, then concentrating in vacuo and recrystallizing the residue from ethanol-hexane) in the above procedure, the products are 5-ethyl - 6' - hydroxy - 1' - methyl - 5 - phenylspiro[pyrimidine-2(1H),2'(1'H)-quinoline]-4,6(3H,5H)-dione and 5-ethyl - 6',7' - dihydroxy - 1' - methyl - 5 - phenylspiro[pyrimidine-2(1H),2'(1'H) - quinoline] - 4,6(3H,5H)-dione.

EXAMPLE 12

Five grams of 5-ethyl-1'-methyl-6'-nitro-5-phenylspiro[pyrimidine - 2(1H),2'(1'H) - quinoline] - 4,6(3H,5H)-dione in 50 ml. of ethyl acetate containing 0.5 g. of Raney nickel is hydrogenated at room temperature until one equivalent of hydrogen is taken up to give, after filtering and removing the solvent in vacuo, 6'-amino-5-ethyl-1'-methyl - 5 - phenylspiro[pyrimidine - 2(1H),2'(1'H)-quinoline]-4,6(3H,5H)-dione.

EXAMPLE 13

Heating 2 g. of 6'-acetamido-5-ethyl-1'-methyl-5-phenylspiro[pyrimidine - 2(1H),2'(1'H) - quinoline] - 4,6(3H,5H)-dione with 2 g. of lithium aluminum hydride in 50 ml. of tetrahydrofuran on a steam bath for two hours, then working up by adding a small amount of water and decanting the organic layer and concentrating it to dryness in vacuo gives 5-ethyl-6'-ethylamino-1'-methyl-5-phenylspiro[pyrimidine - 2(1H),2'(1'H) - quinoline]-4,6(3H,5H)-dione.

EXAMPLE 14

Refluxing an ethanol solution of 6-methoxycarbonyl-1-methylcarbostyril with an excess of 10% sodium hydroxide solution, then cooling the mixture, acidifying and filtering gives 6-carboxy-1-methylcarbostyril.

Ten grams of 6-carboxy-1-methylcarbostyril, 2.7 g. of sodium methoxide and 8.4 g. of benzyl bromide in ethanol are heated at reflux for four hours. The mixture is then filtered and the filtrate is evaporated to dryness to give 6-benzyloxycarbonyl-1-methylcarbostyril.

Using 6-benzyloxycarbonyl-1-methylcarbostyril in the procedure of Example 10 gives 6'-benzyloxycarbonyl-1,1',3-trimethylspiro[imidazolidine - 2,2'(1'H) - quinoline]. Catalytic hydrogenation in ethyl acetate containing palladium-on-carbon gives, after filtering and removing the solvent in vacuo, 6'-carboxy-1,1',3-trimethylspiro[imidazolidine-2,2'(1'H)-quinoline].

EXAMPLE 15

A mixture of 16 g. of 2-chloroquinoline and 13 g. of benzyl chloride in chloroform is heated at reflux for one hour, then concentrated in vacuo. The residue is treated with ether an dfiltered to give 1-benzyl-2-chloroquinolinium chloride.

To 2.7 g. of sodium methoxide in anhydrous methanol is added 14.4 g. of 1-benzyl-2-chloroquinolinium chloride and the resulting mixture is stirred for four hours, then concentrated in vacuo. To the residue is added 150 ml. of methylene chloride, then 9.7 g. of 2-ethyl-2-phenylmalonamide. The mixture is stirred at room temperature for three hours, then filtered and concentrated in vacuo to give 1' - benzyl - 5 - ethyl - 5 - phenylspiro[pyrimidine-2(1H),2'(1'H)-quinoline]-4,6(3H,5H)-dione.

The above prepared 1'-benzyl compound is hydrogenated at room temperature in dioxane using palladium as catalyst to give, after filtering and removing the solvent in vacuo, 5 - ethyl - 5 - phenylspiro[pyrimidine - 2(1H),2'(1'H)-quinoline]-4,6(3H,5H)-dione.

Similarly using N,N'-dimethylethylenediamine in place of 2-ethyl-2-phenylmalonamide in the above procedure, 1' - benzyl - 1,3 - dimethylspiro[imidazolidine - 2,2'(1'H)-quinoline] is obtained which on hydrogenation by the procedure described above gives 1,3-dimethylspiro[imidazolidine-2,2'(1'H)-quinoline].

EXAMPLE 16

A solution of 2-methoxyquinoline and one equivalent of methylsulfate in chloroform is refluxed for one hour. On the addition of ether and filtration, 1-methyl-2-methoxy-quinolinium methosulfate is obtained.

A solution of this salt in chloroform is treated at room temperature with a solution containing one molar equivalent of N,N'-diethyl-1,2-ethylenediamine and stirred at room temperature for three hours. The resulting suspension is washed with dilute sodium hydroxide, dried and concentrated to give 1,3-diethyl-1'-methylspiro[imidazolidine-2,2'(1'H)-quinoline].

EXAMPLE 17

By the procedure of Example 2, using 1.4 g. of oxamide in place of 2-ethyl-2-phenylmalonamide the product is 1'-methylspiro[imidazolidine - 2,2'(1'H) - quinoline]-4,5-dione.

EXAMPLE 18

By the procedure of Example 9, using 1a,7b-dihydro-3-methyl-6-trifluoromethyl - 1H - cyclopropa[c]-quinolin-2-one and N,N'-dimethyloxamide the product is 1a,7b-dihydro - 1',3,3' - trimethyl - 6 - trifluoromethylspiro[1H-cyclopropa[c]quinoline-2(3H),2'-imidazolidine]-4,5-dione.

EXAMPLE 19

By the procedure of Example 2, using 3,4-dihydro-2-methoxy-1-methylquinolinium methosulfate and oxamide the product is 3',4'-dihydro-1'-methylspiro[imidazolidine-2,2'(1'H)-quinoline]-4,5-dione.

EXAMPLE 20

By the procedure of Example 9, 1a,7b-dihydro-3-methyl-1H-cyclopropa[c]quinolin-2-one is converted to the quinolinium fluoborate salt. Using the above prepared salt and N,N'-dimethylethylenediamine in the procedure of Example 3, the product is 1a,7b-dihydro-1',3,3'-trimethylspiro[1H-cyclopropa[c]quinoline - 2(3H),2' - imidazolidine].

What is claimed is:
1. A compound of the formula:

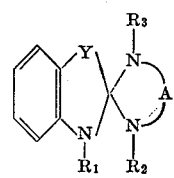

in which:
A is an alkylene chain of 2–3 carbon atoms having 0–3 lower alkyl substituents and 0–1 phenyl substituents or a dioxyalkylene chain of the formula

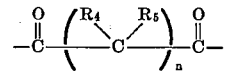

$n$ is 0 or 1;
Y is —CH=CH—, —CH$_2$—CH$_2$— or

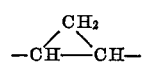

$R_1$ is hydrogen, lower alkyl or lower alkoxy;
$R_2$ and $R_3$ are hydrogen or lower alkyl;
$R_4$ is hydrogen, lower alkyl or phenyl; and
$R_5$ is hydrogen or lower alkyl
or, when A is an alkylene chain as defined above, pharmaceutically acceptable, acid addition salts thereof.

2. A compound according to claim 1 in which A is ethylene, Y is —CH=CH— and $R_1$, $R_2$ and $R_3$ are methyl.

3. A compound according to claim 1 in which A is 2-ethyl-2-phenyl-1,3-dioxopropylene, Y is —CH=CH—, $R_1$ is methyl and $R_2$ and $R_3$ are hydrogen.

4. A compound of the formula:

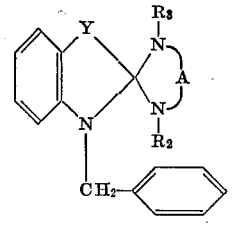

in which:
A is an alkylene chain of 2–3 carbon atoms having 0–3 lower alkyl substituents and 0–1 phenyl substituents or a dioxyalkylene chain of the formula

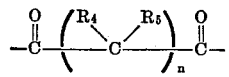

$n$ is 0 or 1;

Y is —CH=CH—, —CH$_2$—CH$_2$— or

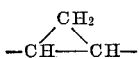

R$_2$ and R$_3$ are hydrogen or lower alkyl;
R$_4$ is hydrogen, lower alkyl or phenyl; and
R$_5$ is hydrogen or lower alkyl.

5. A compound according to claim 4 in which A is ethylene, Y is —CH=CH— and R$_2$ and R$_3$ are methyl.

6. A compound according to claim 4 in which A is 2-ethyl-2-phenyl-1,3-dioxopropylene, Y is —CH=CH— and R$_2$ and R$_3$ are hydrogen.

7. A process for the preparation of compounds of the formula:

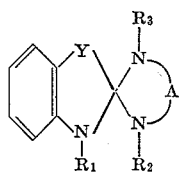

in which:
A is an alkylene chain of 2–3 carbon atoms having 0–3 lower alkyl substituents and 0–1 phenyl substituents or a dioxyalkylene chain of the formula

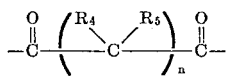

$n$ is 0 or 1;
Y is —CH=CH—, —CH$_2$—CH$_2$— or

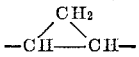

R$_1$ is lower alkyl, lower alkoxy or benzyl;
R$_2$ and R$_3$ are hydrogen or lower alkyl;
R$_4$ is hydrogen, lower alkyl or phenyl; and
R$_5$ is hydrogen or lower alkyl which comprises reacting a quinolinium salt of the formula:

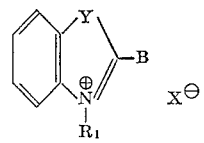

in which Y and R$_1$ are as defined above, B is lower alkoxy or chloro and X is methosulfate or fluoroborate, or a di-lower alkylacetal of a carbostyril of the formula:

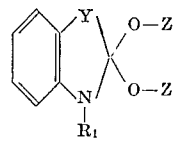

in which Y and R$_1$ are as defined above and Z is a lower alkyl with about an equimolar amount of a diamine or diamide of the formula:

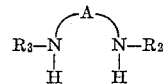

in which A, R$_2$ and R$_3$ are as defined above in an inert solvent at about room temperature for about 1–4 hours.

8. A process according to claim 7 in which A is ethylene, Y is —CH=CH—, and R$_1$, R$_2$ and R$_3$ are methyl.

9. A process according to claim 8 in which A is 2-ethyl-2-phenyl-1,3-dioxopropylene, Y is —CH=CH—, R$_1$ is methyl and R$^z$ R$_3$ are hydrogen.

References Cited
UNITED STATES PATENTS

| | | | |
|---|---|---|---|
| 3,185,696 | 5/1965 | Tien | 260—287 |
| 3,250,776 | 5/1966 | Friedlander et al. | 260—256.4 |
| 3,301,857 | 1/1967 | Berger et al. | 260—288 |

ALEX MAZEL, Primary Examiner

R. J. GALLAGHER, Assistant Examiner

U.S. Cl. X.R.

260—281, 286, 287, 288; 424—251, 258